(12) United States Patent
Miller et al.

(10) Patent No.: US 11,130,379 B2
(45) Date of Patent: Sep. 28, 2021

(54) AXLE-TO-BEAM CONNECTION FOR HEAVY-DUTY VEHICLES

(71) Applicant: Hendrickson USA, L.L.C., Schaumburg, IL (US)

(72) Inventors: David E. Miller, Pickerington, OH (US); Andrew J. Westnedge, Granville, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 112 days.

(21) Appl. No.: 16/553,268

(22) Filed: Aug. 28, 2019

(65) Prior Publication Data

US 2020/0070607 A1 Mar. 5, 2020

Related U.S. Application Data

(60) Provisional application No. 62/724,719, filed on Aug. 30, 2018.

(51) Int. Cl.
  *B60G 7/00* (2006.01)
  *B60G 9/00* (2006.01)
  *B60B 35/00* (2006.01)

(52) U.S. Cl.
  CPC ............ *B60G 7/008* (2013.01); *B60B 35/007* (2013.01); *B60G 9/003* (2013.01); *B60G 2200/31* (2013.01); *B60G 2204/148* (2013.01)

(58) Field of Classification Search
  None
  See application file for complete search history.

(56) References Cited

U.S. PATENT DOCUMENTS

| 2,660,450 | A |   | 11/1953 | Stigum et al. |
| 2,692,135 | A |   | 10/1954 | Crane |
| 4,166,640 | A |   | 9/1979  | Van Denberg |
| 4,566,719 | A |   | 1/1986  | Van Denberg |
| 4,615,539 | A |   | 10/1986 | Pierce |
| 4,722,549 | A |   | 2/1988  | Raidel |
| 4,770,430 | A |   | 9/1988  | Lange |
| 4,881,747 | A |   | 11/1989 | Raidel |
| 5,046,752 | A |   | 9/1991  | Stephens et al. |
| 5,112,078 | A |   | 5/1992  | Galazin et al. |
| 5,346,247 | A |   | 9/1994  | Snyder |
| 5,634,655 | A |   | 6/1997  | Chalin |
| 5,791,743 | A |   | 8/1998  | Sitter et al. |
| 5,791,681 | A |   | 9/1998  | Vandenberg |
| 5,921,570 | A | * | 7/1999  | Lie ..................... B60G 9/00 280/124.175 |

(Continued)

FOREIGN PATENT DOCUMENTS

| EP | 0240649      |   | 10/1987  |             |
| EP | 1088687 A1   | * | 4/2001   | ........... B60G 11/113 |
| FR | 2810274      |   | 12/2001  |             |

*Primary Examiner* — Faye M Fleming
(74) *Attorney, Agent, or Firm* — Dureska & Moore, LLC; David P. Dureska; Brent L. Moore

(57) ABSTRACT

An axle-to-beam connection for a suspension assembly of an axle/suspension system of a heavy-duty vehicle including an axle, a beam, and a top pad. The beam includes an alignment assembly for aligning the axle with the beam. The top pad includes an integrally-formed bump stop boss and is fixedly attached to the axle and removably attached to the alignment assembly of the beam.

12 Claims, 14 Drawing Sheets

(56) References Cited

U.S. PATENT DOCUMENTS

| | | | |
|---|---|---|---|
| 8,371,596 B2* | 2/2013 | Johnson | B60G 11/28 |
| | | | 280/124.116 |
| 9,150,072 B2* | 10/2015 | Ramsey | B60G 7/001 |
| 9,186,947 B2* | 11/2015 | Kopplow | B60G 11/113 |

* cited by examiner

AXLE-TO-BEAM CONNECTION FOR HEAVY-DUTY VEHICLES

CROSS-REFERENCE TO RELATED APPLICATION

This application claims the benefit of U.S. Provisional Patent Application No. 62/724,719, filed Aug. 30, 2018.

BACKGROUND OF THE INVENTION

Field of the Invention

The disclosed subject matter is directed to axle/suspension systems for heavy-duty vehicles. In particular, the subject matter is directed to axle-to-beam connections for heavy-duty vehicle axle/suspension systems. More particularly, the subject matter is directed to an axle-to-beam connection, which utilizes a top pad including a structure that acts as a mechanical bump stop that prevents potential damage to the beam, axle, and/or components of the axle-to-beam connection during jounce events and decreases complexity and manufacturing costs of the axle/suspension system. The axle-to-beam connection of the disclosed subject matter utilizes a window weld located in the top pad to attach the axle to the beam of each suspension assembly of the axle/suspension system and utilizes a structure which minimizes stress on the axle, thereby eliminating line welds on the axle and providing a stronger, more resilient axle-to-beam connection. Furthermore, the axle-to-beam connection utilizes an alignment assembly removably connected to the top pad and attached to or integrated into each beam, enabling separate shipment of the axle and suspension assembly and accurate alignment of the axle with the beam and facilitating quick and simplified on-site attachment without the need for welding equipment.

Background Art

The use of air ride axle/suspension systems in the heavy-duty vehicle industry is known. For purposes of convenience and clarity, reference shall be made generally throughout to a heavy-duty vehicle with the understanding that such reference includes trucks, tractor-trailers and semi-trailers, trailers, and the like. Although axle/suspension systems can be found in widely varying structural forms, in general their structure is similar in that each system typically includes a pair of suspension assemblies. The suspension assemblies are typically connected directly to the primary frame of the heavy-duty vehicle or to a subframe supported by the primary frame. For those heavy-duty vehicles that support a subframe, the subframe can be non-movable or movable, the latter being commonly referred to as a slider box, slider subframe, slider undercarriage, secondary slider frame, or bogey.

Typically, each suspension assembly of an axle/suspension system includes a longitudinally extending elongated beam. The beam is located adjacent to and below a respective one of a pair of spaced apart longitudinally extending main members and one or more cross members which Form the frame or subframe of the heavy-duty vehicle. For purposes of convenience and clarity, reference shall be made throughout generally to a main member with the understanding that such reference includes main members of primary frames, movable subframes and non-movable subframes, and the like. Each beam is pivotally connected at one of its ends to a hanger, which in turn is attached to and depends from a respective one of the main members of the heavy-duty vehicle. Each beam may extend rearwardly or frontwardly relative to the front of the heavy-duty vehicle, thus defining what are typically referred to as trailing-arm or leading-arm axle/suspension systems, respectively. However, for purposes of the description contained herein, it is understood that the term trailing-arm encompasses beams extending either rearwardly or frontwardly with respect to the front end of the heavy-duty vehicle.

An axle extends transversely between and is typically connected by some means to the beams of the pair of suspension assemblies at a selected location from about the mid-point of each beam to the end of the beam opposite the pivotal connection to the hanger. The beam on which the axle is mounted is generally characterized as a bottom-mount underslung beam, a top-mount underslung or overslung beam, or a pass-through beam, which can be an underslung or overslung beam depending on the location of the other components of the axle/suspension system, as is known. More specifically, top-mount underslung or overslung beams are mounted on the top of the axle with a lower portion of the axle being exposed while bottom-mount underslung beams are mounted on the bottom of the axle with an upper portion of the axle being exposed. An air spring, or its equivalent, extends between and is connected to the beam and a respective one of the main members. A brake assembly and one or more shock absorbers may also be mounted on each of the beams and/or axle.

It is also common for the axle/suspension system to feature a lift assembly that enables one or more of the axles of the heavy-duty vehicle to be lifted and maintained in a raised position, such that the wheels and tires attached to the axles are off of the ground. Such lift assemblies are typically used when the heavy-duty vehicle is free of payload, such that fewer than all of the wheels and tires can adequately support the heavy-duty vehicle, or when greater maneuverability of the heavy-duty vehicle is desired. Lifting and maintaining the heavy-duty wheels and tires off of the ground results in reduced wear on the lifted axle and the respective wheels and tires. In addition, lifting one or more axles may provide reduced heavy-duty vehicle operational costs since toll costs are often determined based on only those axles which have wheels in contact with the ground.

The axle/suspension system generally acts to cushion the ride, dampen vibrations, and stabilize the heavy-duty vehicle. More particularly, as the heavy-duty vehicle is traveling over the road, the wheels of the heavy-duty vehicle may encounter road conditions that impart various forces, loads, and/or stresses, to the respective axle on which the wheels are mounted, and in turn, to the suspension assemblies of the axle/suspension system connected to and supporting the axle. In particular, during jounce events, road conditions may impart an upward force directed to the wheel of the heavy-duty vehicle, which causes the attached axle and respective suspension assembly beam to travel upwardly. In axle/suspension systems which include top-mount axle configurations utilizing prior art axle-to-beam connections, bump stops are typically utilized to absorb forces and prevent contact between, and potential damage to, the axle, components of the axle-to-beam connection, and/or the main members of the heavy-duty vehicle during jounce events. Bump stops can be discrete components attached to the axle/suspension system beam and/or main members, or can be incorporated into other components of the axle/suspension system, such as the air spring.

The prior art axle-to-beam connections, while adequately securing the axle to the suspension assembly of the axle/ suspension system, have potential disadvantages, drawbacks, and limitations. For example, in top-mount underslung or overslung and bottom-mount underslung beams, welding alone is typically inadequate to secure the axle to the beam and maintain the integrity of the rigid axle-to-beam connection due to certain forces acting on the axle-to-beam connection during heavy-duty vehicle operation. As a result, top-mount underslung or overslung and bottom-mount underslung axle-to-beam connections are fortified with suitable means, such as with U-bolts, U-bolt brackets or axle seats attached to or integrated into the beam, line welds, other additional mounting hardware, and the like, to maintain integrity and prevent separation of the axle from the beams. However, even with such fortification, the prior art axle-to-beam connections and the axle itself can potentially exhibit less than optimal fatigue strength and service life. In particular, line welds between the axle and the U-bolt bracket/axle seat and areas of the axle near the axle-to-beam connection may exhibit reduced durability in certain heavy-duty vehicle applications, such as operation on harsh road surfaces. More particularly, line welds are discrete welds that start at one point and terminate at a separate point, as is known. The starting and termination points of line welds create areas that are susceptible to stress, known as stress risers. Loads and forces acting on the axle are transferred almost entirely through the line welds attaching the U-bolt bracket/axle seats to the axle, such that the forces imposed on the axle-to-beam connection may potentially compromise the axle and the axle-to-beam connection due to stress risers.

Moreover, prior art axle-to-beam connections are typically pre-assembled during the manufacturing process of the axle/suspension system, such that the axle is irremovably attached to the U-bolt bracket or axle seats. As a result, the axle/suspension systems must be shipped with the axle attached to the beams of the suspension assemblies, increasing the amount of space and cost of shipment as compared to shipping the axle and suspension assemblies separately. In addition, as described above, bump stops or other discrete protection means are typically required to protect the prior art axle-to-beam connections. However, such bump stops or other discrete protection means undesirably increase the weight of the axle/suspension system.

Thus, a need exists in the art for an axle-to-beam connection for heavy-duty vehicle axle/suspension systems that is relatively lighter, reduces manufacturing cost and complexity, eliminates line welds on the axle, and includes a structure that minimizes stress on the axle to provide a stronger, more resilient axle-to-beam connection. There is also a need for an axle-to-beam connection for heavy-duty vehicle axle/suspension systems that incorporates an integral bump stop and includes structures that facilitate accurate alignment and quick, simplified removable attachment of the axle to the suspension assembly beam without the need for on-site welding equipment. The axle-to-beam connection for heavy-duty axle/suspension systems of the disclosed subject matter satisfies these needs.

SUMMARY OF THE INVENTION

Objectives of the present invention include providing an axle-to-beam connection for heavy-duty vehicle axle/suspension systems that eliminates line welds and minimizes stress on the axle.

A further objective of the present invention is to provide an axle-to-beam connection for heavy-duty axle/suspension systems that facilitates accurate alignment of the axle with the beams of the suspension assemblies.

Yet another objective of the present invention is to provide an axle-to-beam connection for heavy-duty vehicle axle/suspension systems that facilitates removable attachment of the axle to the beam of the suspension assembly without on-site welding equipment.

Still another objective of the present invention is to provide an axle-to-beam connection that incorporates an integrally formed bump stop that is relatively lighter and has reduced manufacturing cost and complexity.

These objectives and advantages are obtained by the axle-to-beam connection for a suspension assembly of an axle/suspension system of the disclosed subject matter. The axle-to-beam connection includes an axle, a beam, and a top pad. The beam includes an alignment assembly for aligning the axle with the beam. The top pad is fixedly attached to the axle and removably attached to the alignment assembly of the beam.

BRIEF DESCRIPTION OF THE SEVERAL VIEWS OF THE DRAWINGS

The exemplary embodiment of the present invention, illustrative of the best mode in which applicant has contemplated applying the principles, is set forth in the following description, shown in the drawings, and particularly and distinctly pointed out and set forth in the appended claims.

Similar reference characters indicate similar parts throughout.

DESCRIPTION OF THE PREFERRED EMBODIMENT

Figure 1:
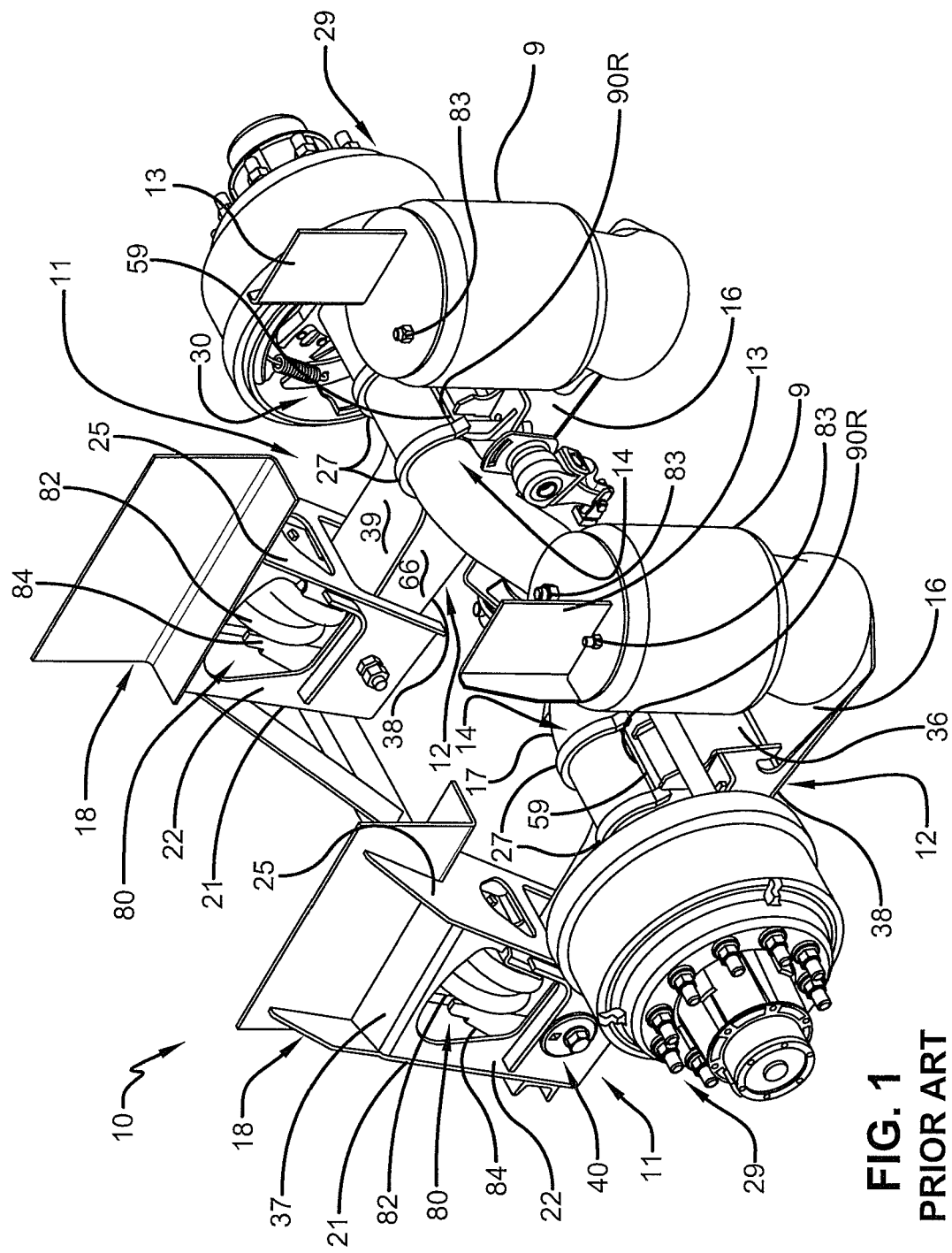
FIG. 1 is a top rear driver-side perspective view of an axle/suspension system including a pair of suspension assemblies connected to the axle by prior art axle-to-beam connections.
Figure 2:
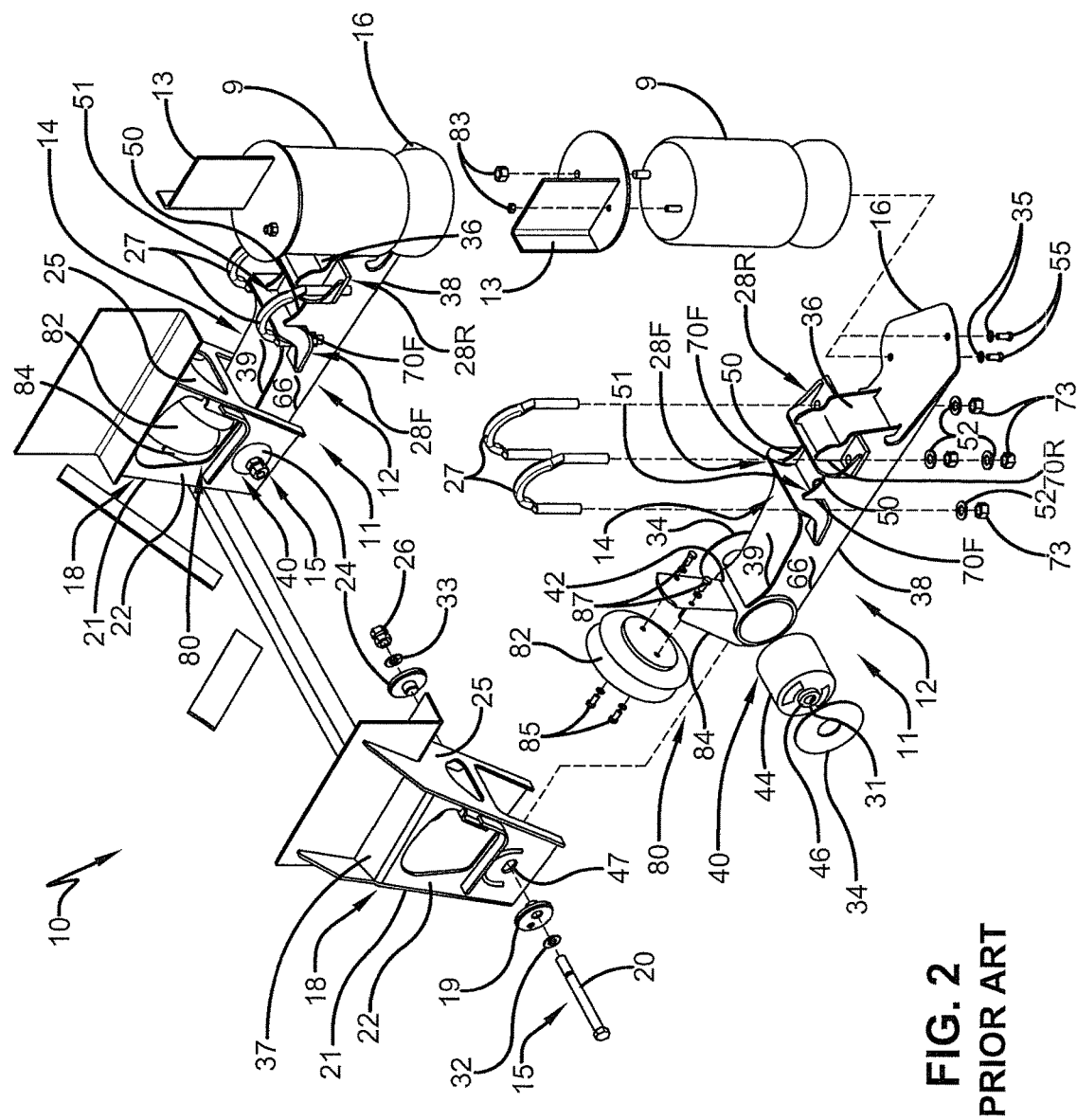
FIG. 2 is a top rear driver-side perspective view of the heavy-duty vehicle axle/suspension system shown in FIG. 1, showing the component parts of the driver-side suspension assembly, including the prior art axle-to-beam connection, in exploded view.
Figure 2A:
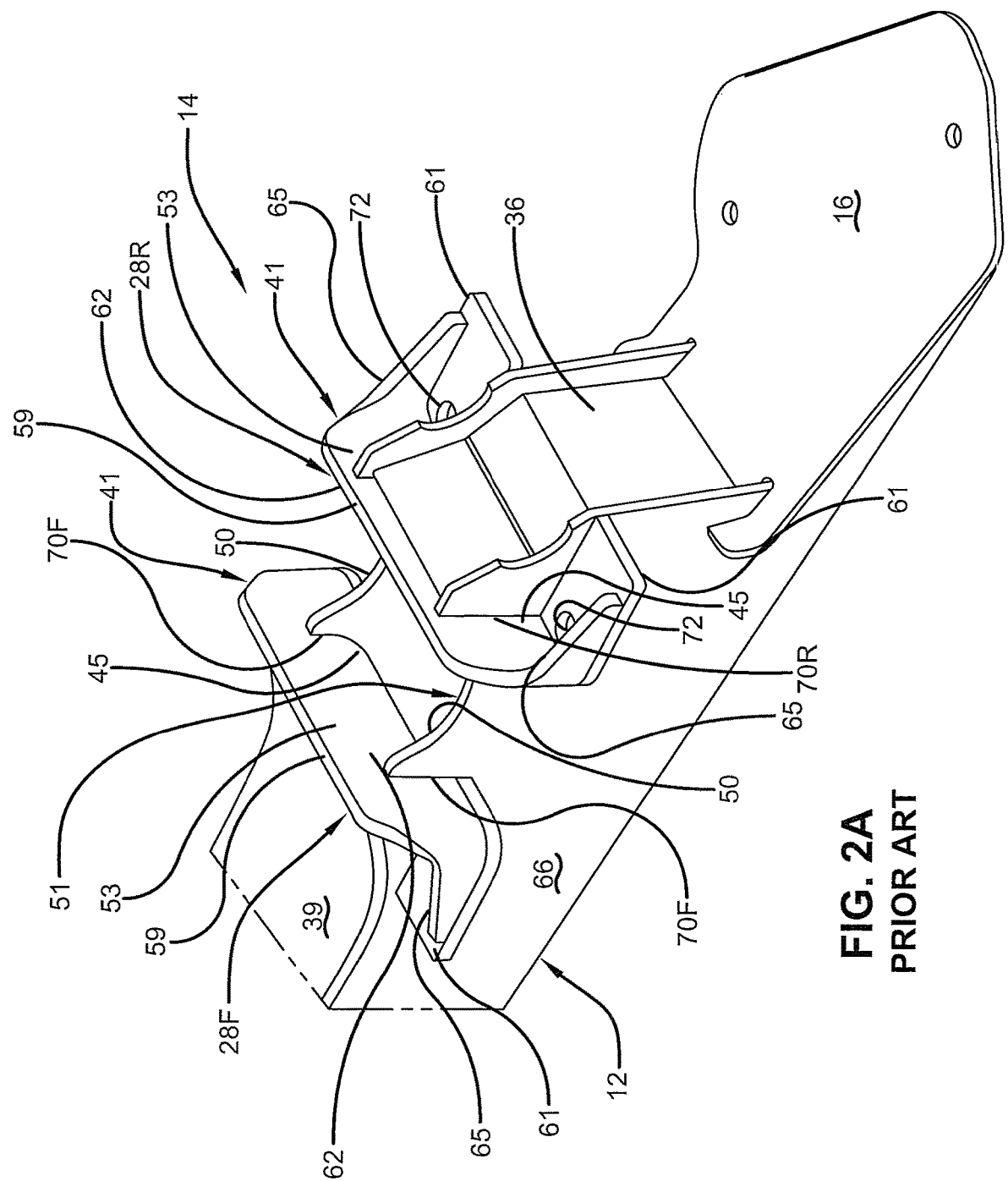
FIG. 2A is an enlarged fragmentary perspective view of a portion of the driver-side suspension assembly shown in FIG. 1.
Figure 3:
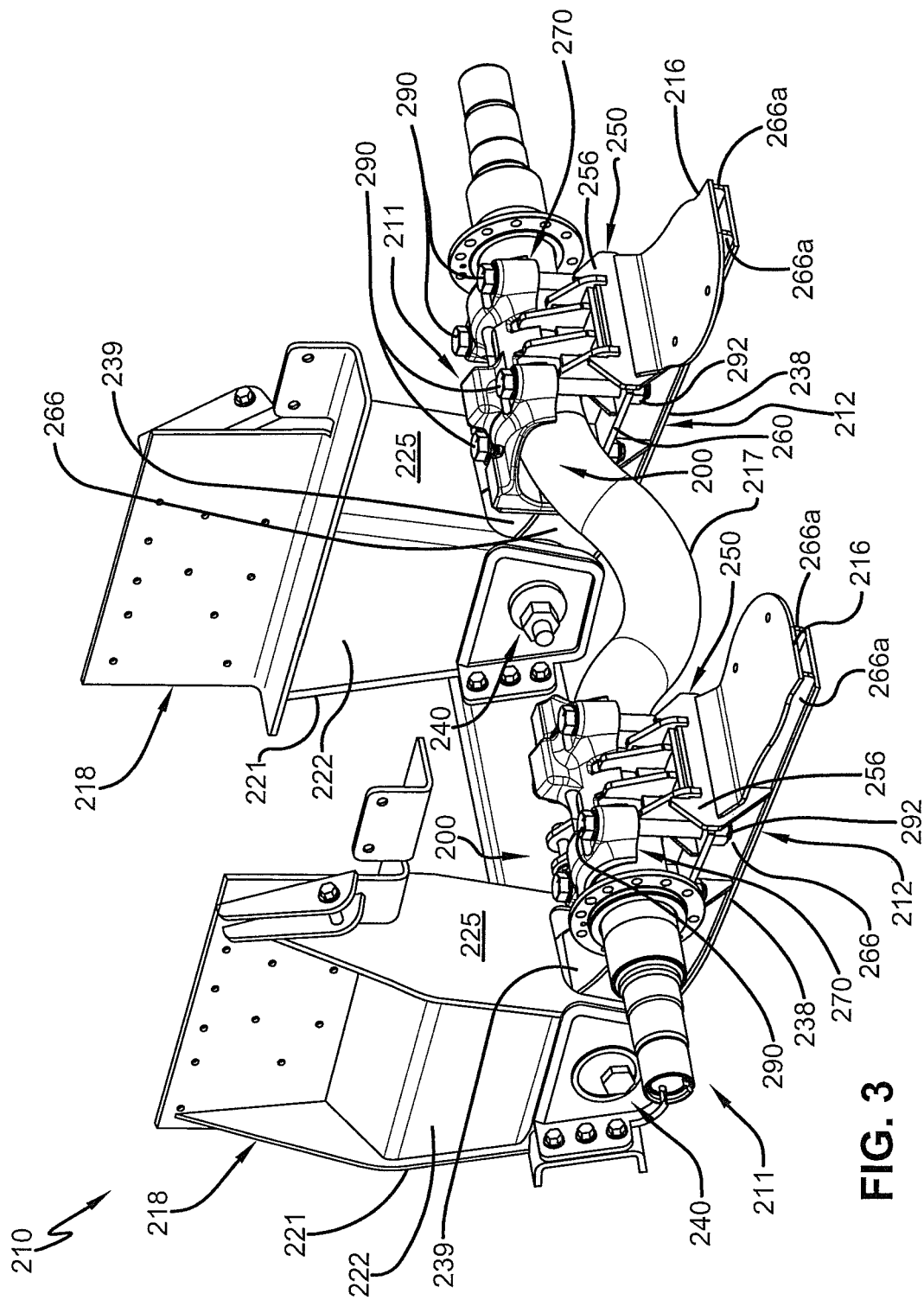
FIG. 3 is a top rear driver-side perspective view of an axle/suspension system with a pair of suspension assemblies connected to the axle by exemplary embodiment axle-to-beam connections of the disclosed subject matter.
Figure 4:
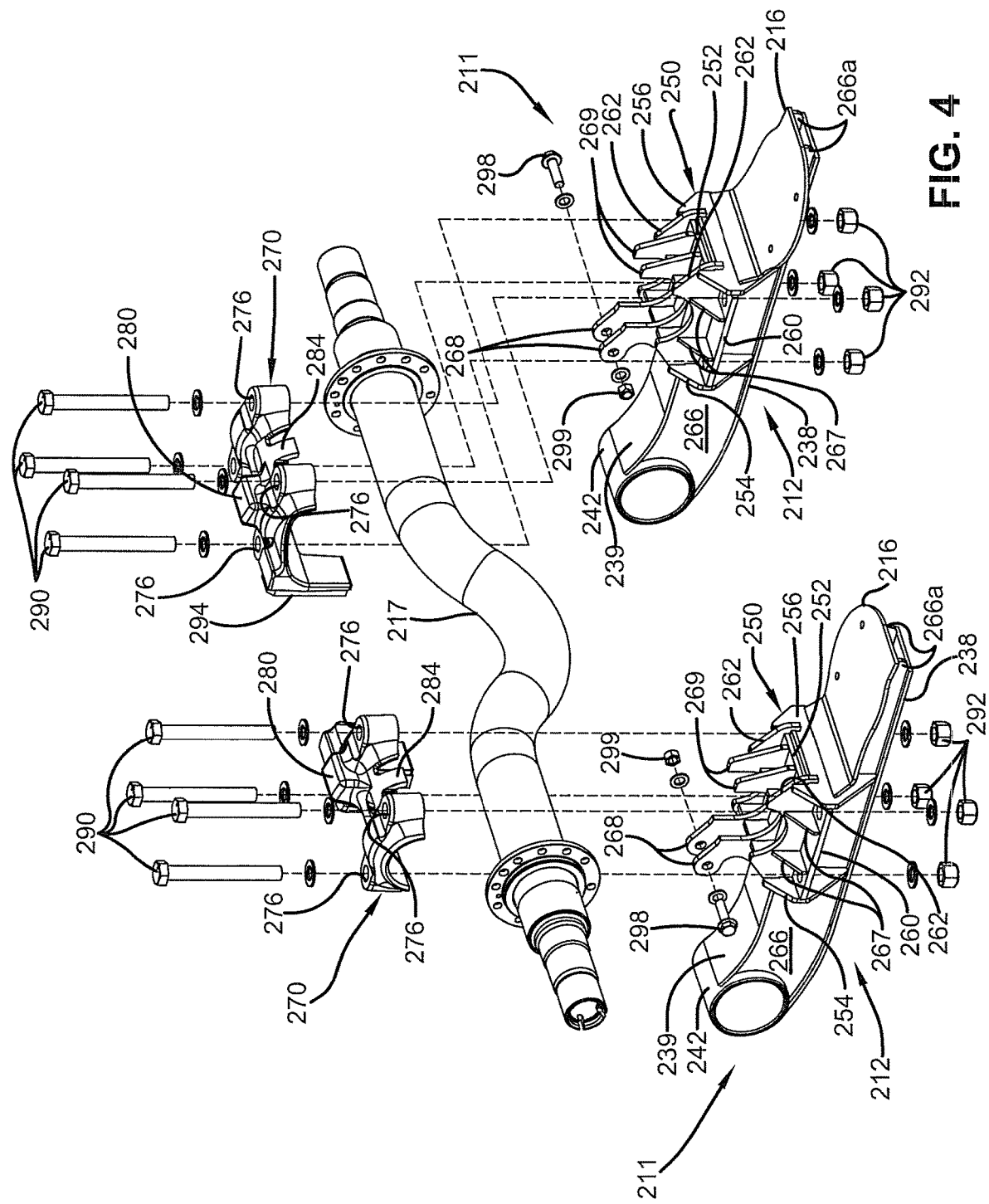
FIG. 4 is a top rear driver-side perspective view of the axle/suspension system shown in FIG. 3, showing the component parts of the suspension assemblies, including the exemplary embodiment axle-to-beam connection of the disclosed subject matter, in exploded view.
Figure 5:
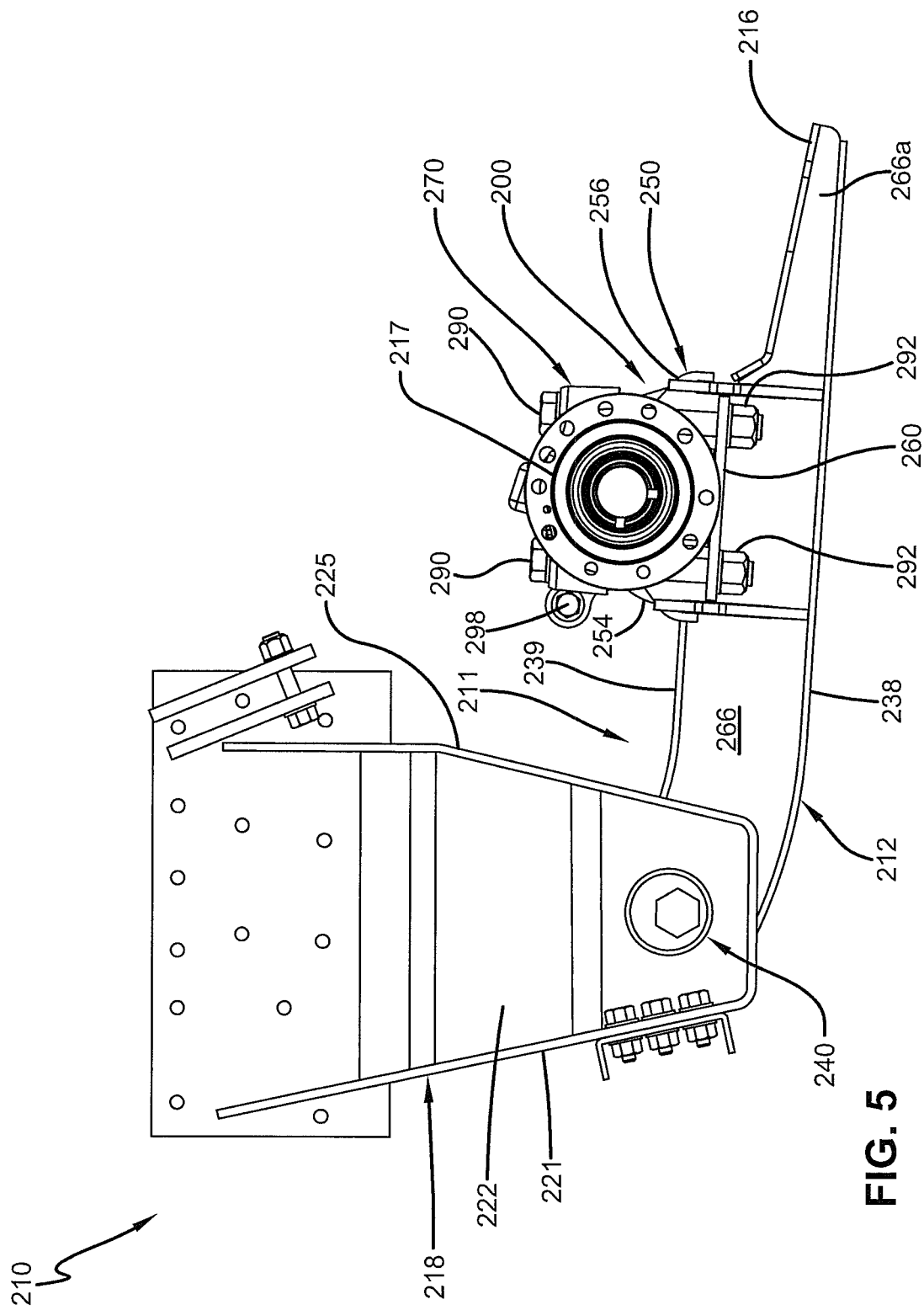
FIG. 5 is a driver-side elevational view of the axle/suspension system shown in FIGS. 3-4, showing the exemplary embodiment axle-to-beam connection of the disclosed subject matter.

In order to better understand the environment in which the axle to beam connection of the disclosed subject matter is utilized, a liftable axle/suspension system 10 incorporating a pair of prior art axle-to-beam connections 14 is shown in FIGS. 1-2A. Axle/suspension system 10 includes a pair of transversely spaced mirror-image suspension assemblies 11. Because suspension assemblies 11 are mirror-images of each other, only one of the suspension assemblies will be described in detail.

Suspension assembly 11 includes a beam 12 having a generally rigid metal box-like structure comprising a pair of transversely spaced vertical sidewalls 66. A bottom wall 38, a first top plate 39, and a second top plate 36 extend between and interconnect sidewalls 66. Sidewalls 66 and bottom wall 38 are integrally formed as a single-piece with a generally U-shaped cross-section by stamping or bending. First top plate 39 and second top plate 36 are in a longitudinal spaced arrangement along beam 12 and secured to sidewalls 66 via welding or other suitable means. Beam 12 also includes a mounting tube 42 formed of robust steel attached to the front ends of sidewalls 66, bottom wall 38, and first top plate 39.

Beam 12 also includes a platform 16, which extends from the rear end of the beam and is rigidly attached by suitable means, such as welds, to sidewalls 66 adjacent second top plate 36 near the rear end of the beam. A conventional bellows-type air spring 9 is attached to and extends between platform 16 and a respective main member of the heavy-duty vehicle, as is known. In particular, air spring 9 has a mounting bracket 13 secured to the air spring by nuts 83. Mounting bracket 13 is secured to the main member with fasteners, as is known. Air spring 9 is secured to platform 16 with bolts 55 and washers 35. A shock absorber (not shown) may also be attached to and extend between beam 12 and the respective main member or hanger, as is known. An axle 17 extends between and is rigidly connected to the rear end of each beam 12 by components of prior art axle-to-beam connection 14, as described in greater detail below. For purposes of completeness, axle/suspension system 10 is also shown having a respective wheel end assembly 29 with a drum brake assembly 30 attached to each end of axle 17.

Beam 12 is pivotally mounted by a bushing assembly 40 to a hanger 18, which depends from and is secured to a main member (not shown) of a heavy-duty vehicle (not shown), as is known. Hanger 18 typically includes a generally box-like sturdy metal structure having a pair of transversely-spaced vertical sidewalls 22 extending between a vertical front wall 21 and a vertical rear wall 25. A top wall 37 extends between and is attached to front wall 21 and rear wall 25. Bushing assembly 40 includes an elastomeric bushing 44 press fit into mounting tube 42 of beam 12. Bushing 44 is molded about and adhesively attached to a central metal sleeve 46 formed with an opening 31, which extends through the sleeve. Sleeve 46 extends completely through bushing 44 and protrudes outwardly from the bushing to facilitate pivotal mounting of beam 12 on hanger 18. Bushing assembly 40 includes a fastener assembly 15 having a bolt 20, which, together with a nut 26, is utilized to secure the components of the bushing assembly together and pivotally mount beam 12 to hanger 18. In particular, bolt 20 passes through a first washer 32, an eccentric washer 19 disposed adjacent the outboard sidewall 22 of hanger 18, an opening 47 formed in the outboard sidewall of the hanger, opening 31 of bushing sleeve 46, an opening (not shown) formed in the inboard sidewall of the hanger, an inboard non-eccentric washer 24 disposed adjacent the inboard sidewall of the hanger, and a second washer 33 to receive nut 26. Eccentric washer 19 provides a means for adjusting alignment of axle/suspension system 10, as is known. In addition, a respective one of a pair of conventional spacer discs 34, formed of ultra-high molecular weight polyethylene, is disposed between bushing 44 and each sidewall 22 of hanger 18 to prevent contact between metal components of mounting tube 42 and the hanger.

Suspension assembly 11 also includes a lift assembly 80, which enables beam 12 with axle 17 to be lifted and maintained in a raised position by prior art axle-to-beam connection 14 during certain heavy-duty vehicle operations. Lift assembly 80 generally includes an elastomeric bellows type air chamber 82 and a lift arm 84. Lift arm 84 is rigidly attached, such as by welding, to mounting tube 42 of beam 12 and extends upwardly into hanger 18. The front end of air chamber 82 is attached to the rear surface of lift arm 84 by fasteners 85. The rear end of air chamber 82 is attached to the front surface of rear wall 25 of hanger 18 by fasteners 87. As air from an air supply source (not shown) installed on the heavy-duty vehicle is introduced into air chamber 82, and as air is simultaneously released from air spring 9, the air chamber expands away from rear wall 25 of hanger 18 and applies a forward force on lift arm 84. This forward force causes arcuate upward movement of beam 12 about bushing assembly 40 that enables suspension assembly 11, axle 17, and wheel end assembly 29 attached to the axle to be lifted and maintained in a raised position.

As described above, axle 17 is connected to suspension assembly 11 utilizing prior art axle-to-beam connection 14. Prior art axle-to-beam connection 14 generally includes a front U-bolt bracket/axle seat 28F and a rear U-bolt bracket/axle seat 28R connected to or integrated into beam 12. With particular reference to FIGS. 2-2A, both front and rear U-bolt brackets/axle seats 28F, 28R include a generally vertical interconnecting member 41, a generally horizontal member 61, and a strengthening web 65. Interconnecting member 41 includes a lower portion 45, an upper portion 53 with a terminal edge 59, and a surface 62. Each horizontal member 61 includes a pair of openings 72, each of which is formed through the inboard and outboard side of the respective horizontal member. Lower portion 45 of front U-bolt bracket/axle seat 28F nests in a pair of transversely-spaced front slots 70F formed in sidewalls 66 of beam 12 adjacent the rear end of first top plate 39. Lower portion 45 of U-bolt bracket/axle seat 28F extends downwardly adjacent to the front portion of axle 17, such that surface 62 faces the front portion of the axle, and is rigidly secured to beam 12 using any suitable method, such as welding. Similarly, lower portion 45 of rear U-bolt bracket/axle seat 28R nests in a pair of transversely-spaced rear slots 70R formed in sidewalls 66 of beam 12 spaced a longitudinal distance from front slots 70F and adjacent the front end of second top plate 36. Lower portion 45 of U-bolt bracket/axle seat 28R extends downwardly toward and adjacent to the rear portion of axle 17, such that surface 62 faces the rear portion of the axle, and is rigidly secured to beam 12 using any suitable method, such as welding. The upper edges of sidewalls 66 of beam 12 are each integrally formed with an arch 50 between front and rear slots 70F, 70R. U-bolt bracket/axle seats 28F, R, together with arches 50, form an axle locus 51, which is generally known or referred to as an axle seat.

Prior art axle-to-beam connection 14 requires a pair of generally identical inboard and outboard connections for attaching axle 17 to beam 12 of the respective suspension assembly 11. This is typically accomplished by a pair of U-bolts 27. Each U-bolt 27 is disposed about axle 17 and through openings 72 of front and rear U-bolt brackets/axle seats 28F, 28R, respectively. A washer 52 (FIG. 2) is disposed over each of a respective one of a pair of threaded ends of U-bolt 27. A nut 73 threadably engages each of a respective one of the pair of ends of U-bolt 27 and is tightened to secure axle 17 into axle locus 51 of beam 12.

In addition, axle 17 is also irremovably attached to front and rear U-bolt bracket/axle seats 28F, 28R by a front line weld (not shown) and a rear line weld 90R (FIG. 1). The front line weld is formed along the interface between terminal edge 59 of upper portion 53 of interconnecting member 41 of front U-bolt bracket/axle seat 28F and axle 17 at or just beyond the horizontal centerline of the axle. Similarly, rear line weld 90R is formed along the interface between terminal edge 59 of upper portion 53 of interconnecting member 41 of rear U-bolt bracket/axle seat 28R and axle 17 at or just beyond the horizontal centerline of the axle. Together, U-bolts 27, the front line weld, and rear line weld 90R rigidly attach axle 17 to beam 12 of suspension assembly 11 to complete prior art axle-to-beam connection 14.

Prior art axle-to-beam connection 14, while adequately securing axle 17 to beam 12 of suspension assembly 11, has disadvantages, drawbacks, and limitations. For example, during heavy-duty vehicle operation under harsh driving conditions, such as on harsh road surfaces, prior art axle-to-beam connection 14 potentially has reduced fatigue strength and durability. In particular, the starting and the termination points of the front line weld and rear line weld 90R on axle 17 create stress risers on or near axle-to-beam connection 14. These stress risers can potentially compromise axle-to-beam connection 14 and axle 17 during heavy-duty vehicle operation under harsh driving conditions, due to forces imposed on the axle-to-beam connection, and cause failure of the line welds. More particularly, during heavy-duty vehicle operation certain forces are imparted from beam 12 substantially through the front line weld and rear line weld 90R to axle 17, which can potentially result in failure of axle-to-beam connection 14, thereby increasing heavy-duty vehicle downtime and repair cost.

In addition, because axle 17 is irremovably connected to beam 12 of suspension assembly 11 during manufacturing, axle/suspension system 10 must be shipped with the axle attached to the beams of the suspension assemblies, increasing the cost of and amount of space required for shipments as compared to separately shipping the axles and the suspension assemblies. Moreover, suspension assemblies 11 require bump stops, or other discrete components to protect contact between and potential damage to prior art axle-to-beam connections 14 and the members of the heavy-duty vehicle during jounce events, undesirably increasing the weight, manufacturing cost, and complexity of axle/suspension system 10. The axle-to-beam connection of the disclosed subject matter overcomes the disadvantages, drawbacks, and limitations associated with prior art axle-to-beam connection 14 and provides additional benefits.

An exemplary embodiment axle-to-beam connection 200 of the disclosed subject matter is shown in FIGS. 3-13 utilized in conjunction with a beam 212 and an axle 217 of an axle/suspension system 210.

Axle/suspension system 210 is similar in construction and arrangement to axle/suspension system 10 (FIGS. 1-2A) described above. Axle/suspension system 210 includes a pair of transversely-spaced mirror-image suspension assemblies 211 depending from respective main members (not shown) of a heavy-duty vehicle (not shown). Axle 217 extends transversely between and is rigidly connected to each suspension assembly 211 by exemplary embodiment axle-to-beam connection 200. Because suspension assemblies 211 are mirror images of each other and for purposes of conciseness and clarity, only one of the suspension assemblies will be described in detail.

Figure 9:
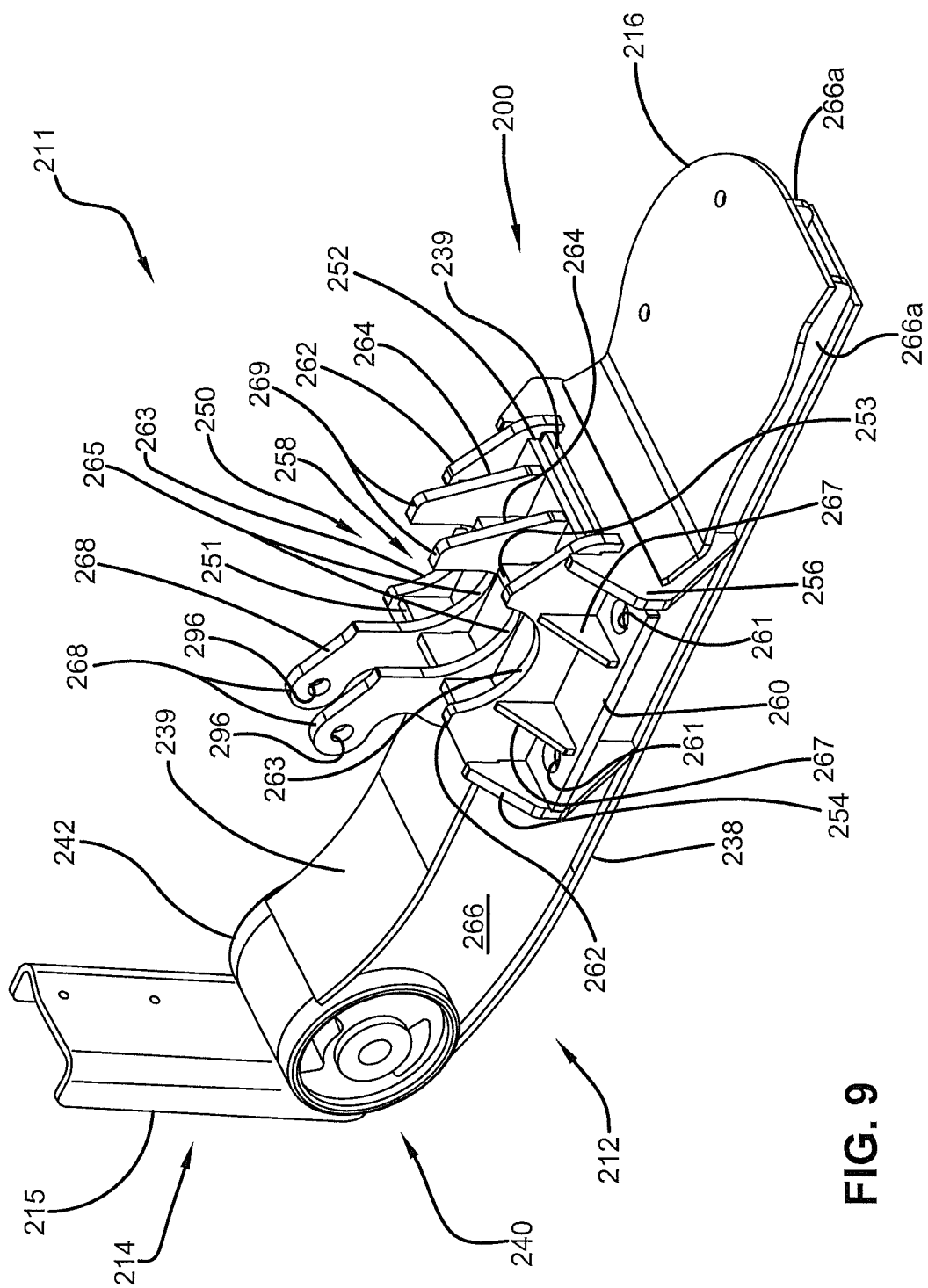
FIG. 9 is a top rear perspective view of selected components of the driver-side suspension assembly of the axle/suspension system shown in FIGS. 3-8, showing components of the alignment assembly of the exemplary embodiment axle-to-beam connection of the disclosed subject matter.
Figure 10:
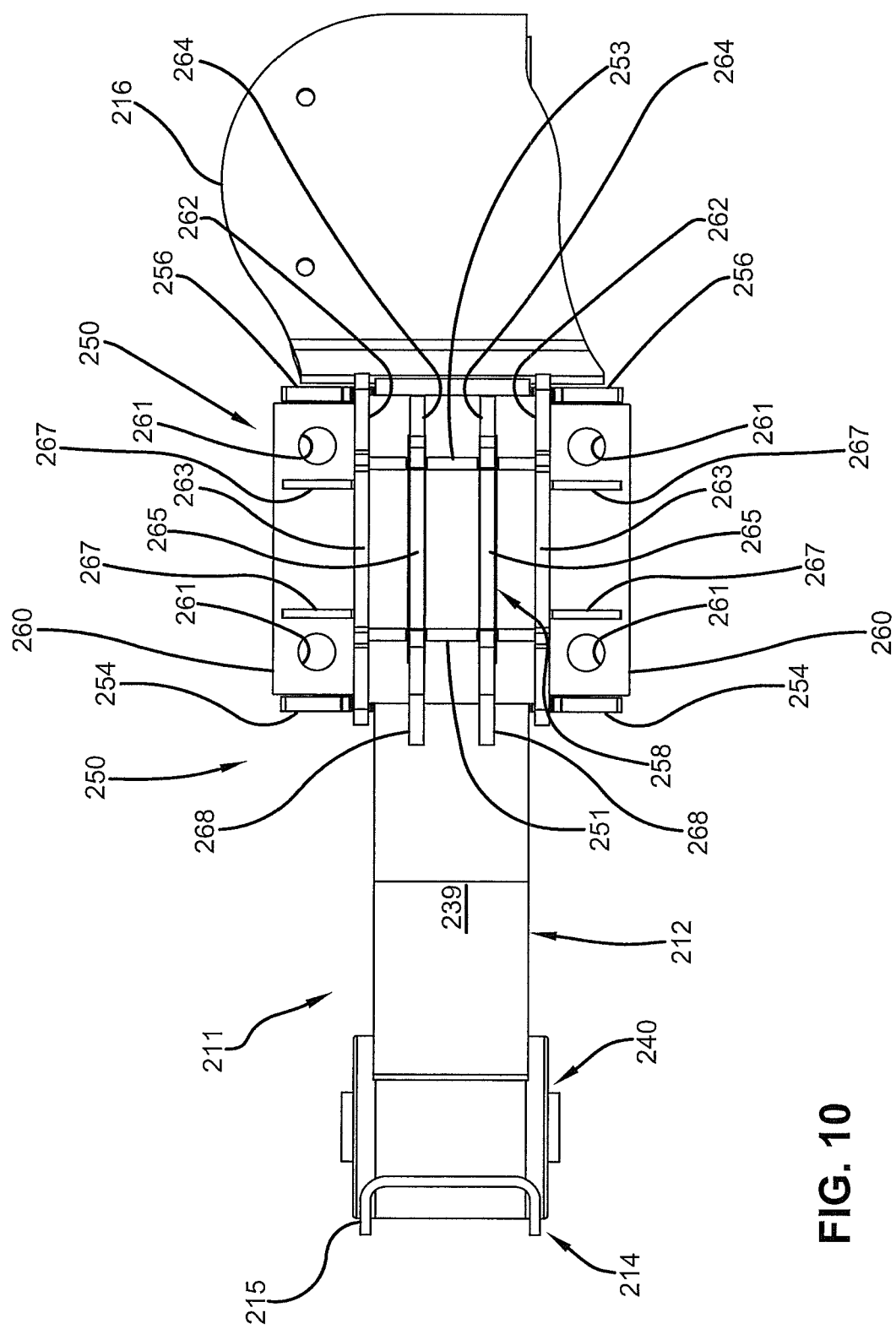
FIG. 10 is a top plan view of selected components of the driver-side suspension assembly including the alignment assembly of the exemplary embodiment axle-to-beam connection shown in FIG. 8.

Suspension assembly 211 includes beam 212, which is a generally rigid metal box-like structure. With particular reference to FIGS. 9-10, beam 212 generally comprises a pair of transversely spaced vertical sidewalls 266 interconnected by a longitudinal top plate 239 and a longitudinal bottom plate 238. Bottom plate 238 is rigidly attached by any method, such as welding, to sidewalls 266 and extends slightly inboardly and outboardly of the sidewalls. A mounting tube 242 (FIG. 9) formed of any suitably robust material, such as steel, is rigidly attached to the front ends of sidewalls 266, top plate 239, and bottom plate 238. Beam 212 is pivotally attached by a bushing assembly 240 to a hanger 218, which depends from and is secured to the main member of the heavy-duty vehicle by any suitable means, such as welds or fasteners. Bushing assembly 240 is similar in structure and function to bushing assembly 40 (FIGS. 1-2A) described above and is disposed in mounting tube 242. Hanger 218 includes a generally box like sturdy metal structure having a pair of transversely-spaced vertical sidewalls 222 attached to and extending between a vertical front wall 221 and a vertical rear wall 225.

Figure 8:
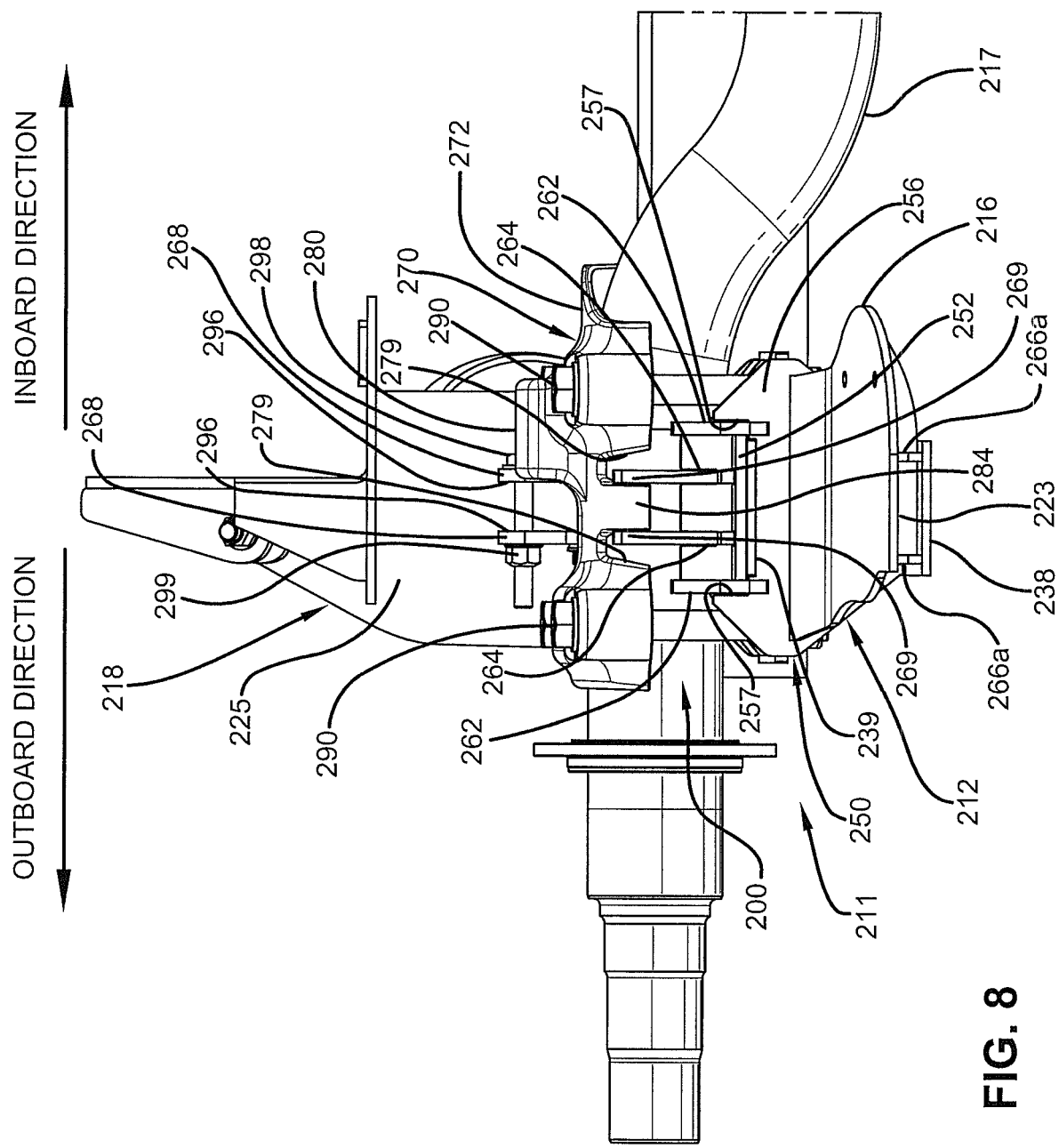
FIG. 8 is an enlarged rear fragmentary elevational view of the driver-side suspension assembly shown in FIGS. 3-7, showing the exemplary embodiment axle-to-beam connection of the disclosed subject matter.

Beam 212 also includes a front support plate 254 and a rear support plate 256 to accommodate mounting and/or attachment of components of exemplary embodiment axle-to-beam connection 200 to beam 212, as will be described in greater detail below. Rear support plate 256 is disposed transversely across beam 212 near the rear end of top plate 239 and extends downwardly into the beam. In particular, the rear of each sidewall 266 of beam 212 contacts the front surface of rear support plate 256, which is suitably attached, such as by welding, to the sidewalls. An inboard and outboard portion of rear support plate 256 also extend laterally outward of and downwardly adjacent to the respective inboard and outboard surfaces of sidewalls 266 and contact or abut bottom plate 238 of beam 212. Rear support plate 256 is also rigidly attached, such as by welding, to the respective inboard and outboard surfaces of sidewalls 266. With particular reference to FIG. 8, rear support plate 256 is also formed with a pair of notches 257 through which top plate 239 of beam 212 extends to further integrate the rear support plate with the beam.

With particular reference to FIGS. 9-10, front support plate 254 is spaced a longitudinal distance forward of rear support plate 256 along beam 212. Front support plate 254 is positioned on a respective inboard or outboard surface of sidewall 266 of beam 212, extends downwardly over the respective inboard or outboard surface of the sidewall, and contacts bottom plate 238 of the beam. Front support plate 254 is rigidly attached, such as by welding, to the respective outboard or inboard surface of sidewall 266. Front support plate 254 has a transverse profile, which corresponds and is longitudinally-aligned with a respective inboard or outboard portion of rear support plate 256.

Beam 212 includes a platform 216, which is rigidly attached by welding or other suitable means to a pair of rearwardly extending beam extensions 266a integrally formed with sidewalls 266 near the rear end of beam 212. Beam 212 also includes at least one, but, more preferably, a pair of gussets 223 (FIG. 8; only one shown), which provide support to platform 216. In particular, gussets 223 are attached between the bottom surface of platform 216 and the top surface of bottom plate 238. More specifically, gussets 223 extend inboardly from the inboard surface of the outboard beam extension 266a through a slot (not shown) formed in the inboard beam extension 266a to a location adjacent the inboard edge of platform 216. The front end of platform 216 contacts the rear surface of rear support plate 256 and is rigidly attached, such as by welding, to the rear support plate. Platform 216 extends from the rear end of beam 212 and supports a conventional bellows-type air spring (not shown) that is attached to and extends between the platform and a respective main member of the heavy-duty vehicle, as is known.

Beam 212 is connected to a lift assembly 214 (FIGS. 9-10; partially shown) that is similar in structure and function to lift assembly 80 (FIGS. 1-2), described above. Lift assembly 214 enables beams 212 and axle 217, attached to the beams in a manner described below, to be lifted and maintained in a raised position during certain heavy-duty vehicle operations. Lift assembly 214 generally includes an elastomeric bellows-type air chamber (not shown) and a lift arm 215. Lift arm 215 is rigidly attached, such as by welding, to mounting tube 242 of beam 212 and extends upwardly into hanger 218. The front end of the air chamber is attached to the rear surface of lift arm 215 by fasteners (not shown). The rear end of the air chamber is attached to the front surface of rear wall 225 of hanger 218 by fasteners (not shown). As air from an air supply source (not shown) installed on the heavy-duty vehicle is introduced into the air chamber, and air is simultaneously released from the air spring, the air chamber expands away from rear wall 225 of hanger 218, applying force to lift arm 215 and causing arcuate upward movement of beam 212 about bushing assembly 240, thereby enabling axle/suspension system 210, axle 217, and wheels (not shown) attached to the axle to be lifted and maintained in a raised position.

In accordance with an important aspect of the disclosed subject matter, exemplary embodiment axle-to-beam connection 200 of axle/suspension system 210 also includes alignment structures, enabling beam 212 to be accurately aligned with axle-to-beam connection 200 and quickly attached to axle 217. In particular, axle-to-beam connection 200 comprises a two-part connection, which generally includes an axle alignment assembly 250 and a top pad 270. More particularly, and with particular reference to FIGS. 9-10, alignment assembly 250 is rigidly connected or integrated into beam 212 of suspension assembly 211. Alignment assembly 250 includes a bottom plate 252 positioned on the top surface of top plate 239 of beam 212. Alignment assembly 250 includes a pair of longitudinally-extending vertically-oriented outer seating plates 262 rigidly attached, such as by welding, to a respective inboard and outboard side of bottom plate 252. One of the pair of outer seating plates 262 is positioned between the outboard surface of the outboard sidewall 266 of beam 212 and both an inboard facing surface of the outboard front support plate 254 and an inboard facing surface of the outboard portion of rear support plate 256 and is rigidly attached, such as by welding, to the front support plate and the rear support plate. Likewise, the other one of the pair of outer seating plates 262 is positioned between the inboard facing surface of the inboard sidewall 266 of beam 212 and both the outboard facing surface of the inboard front support plate 254 and the outboard facing surface of the inboard portion of rear support plate 256 and is rigidly attached, such as by welding, to the front support plate and the rear support plate.

Alignment assembly 250 also includes a pair of bolt brackets 260. Each bolt bracket 260 extends transversely outward from the respective outer seating plate 262 of alignment assembly 250 and longitudinally between each respective inboard or outboard portion of front support plate 254 and the corresponding portion of rear support plate 256. Each bolt bracket 260 is rigidly attached, such as by welding, to the respective front support plate 254, outer seating plate 262, and rear support plate 256 to further rigidly attach alignment assembly 250 to beam 212. With particular reference to FIGS. 4, 6, and 9-10, a pair of longitudinally-spaced, transversely-extending gussets 267 are rigidly attached, such as by welding, between each bolt bracket 260 and its respective outer seating plate 262 to reinforce the bolt bracket. Each bolt bracket 260 is formed with a pair of longitudinally spaced and transversely-aligned openings 261 for receiving a respective number of bolts 290, as described below.

With continued reference to FIGS. 9-10, alignment assembly 250 further includes a front lateral support plate 251 and a rear lateral support plate 253. Front and rear lateral support plates 251, 253 are disposed on or adjacent the front and rear of bottom plate 252, respectively, extend transversely between outer seating plates 262, and are rigidly attached to the outer seating plates and the bottom plate by any suitable means, such as welds. A pair of longitudinally-extending vertically-oriented inner seating plates 264 are each formed with a pair of longitudinally-aligned notches (not shown) which align with and are disposed over front and rear lateral support plates 251, 253. Inner seating plates 264 are seated on bottom plate 252 and transversely-spaced between outer seating plates 262. Inner seating plates 264 are rigidly attached, such as by welding, to bottom plate 252, front lateral support plate 251, and rear lateral support plate 253. Each one of inner and outer seating plates 264, 262, respectively, is formed with a respective arcuate or other suitably-shaped edge 265, 263. Edges 263, 265 are transversely aligned to create an axle seat or axle locus 258. Each of inner seating plates 264 may also be formed with a respective one of a pair of transversely aligned openings 296. Openings 296 enable a shock absorber (not shown) to be mounted and secured to alignment assembly 250 by a fastener or a bolt 298 and a nut 299 (FIGS. 4-8).

Figure 11:
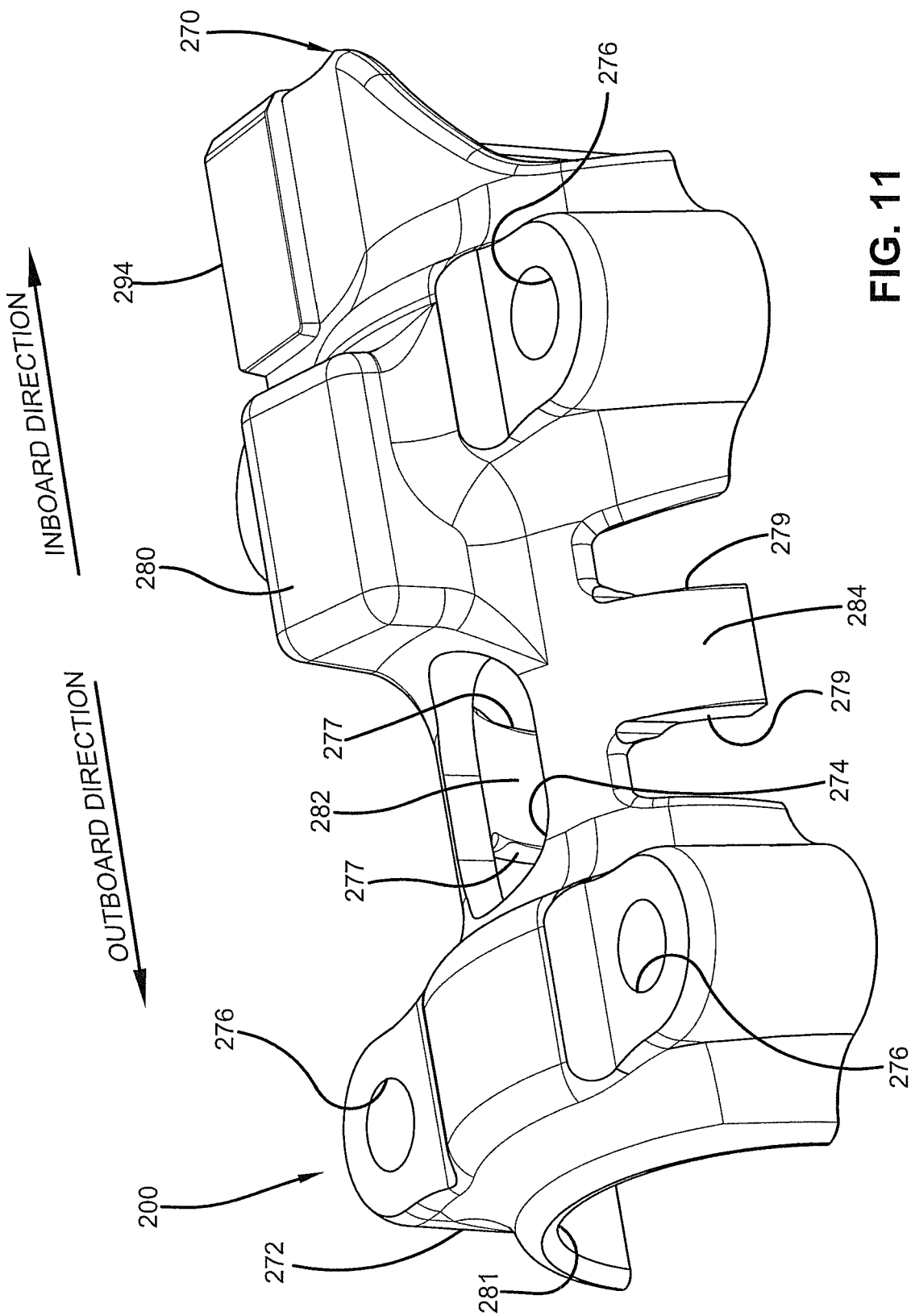
FIG. 11 is an enlarged top rear driver-side perspective view of the top pad of the exemplary embodiment axle-to-beam connection of the disclosed subject matter shown in FIGS. 3-7.
Figure 12:
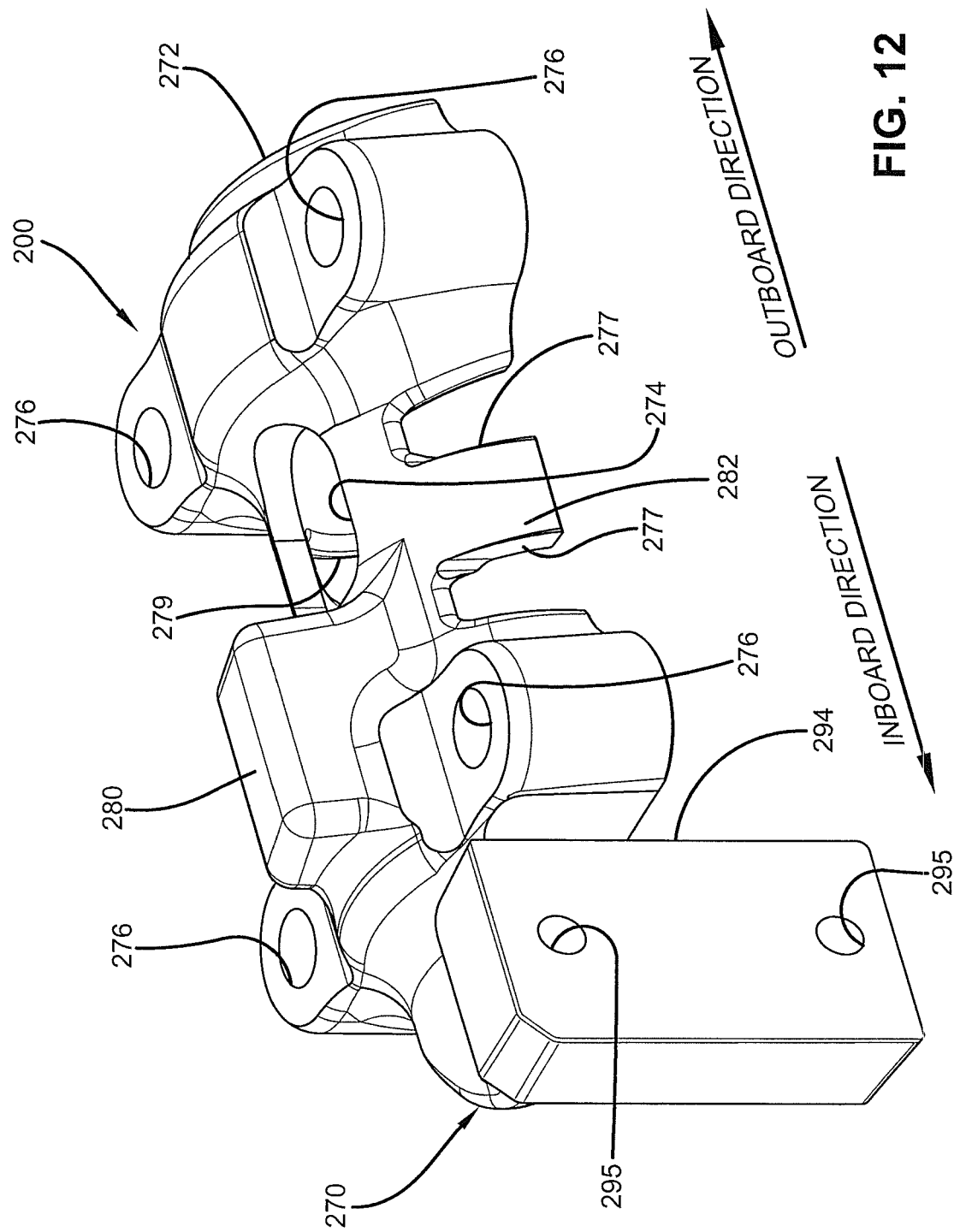
FIG. 12 is a top front perspective view of the top pad shown in FIGS. 10-11.
Figure 13:
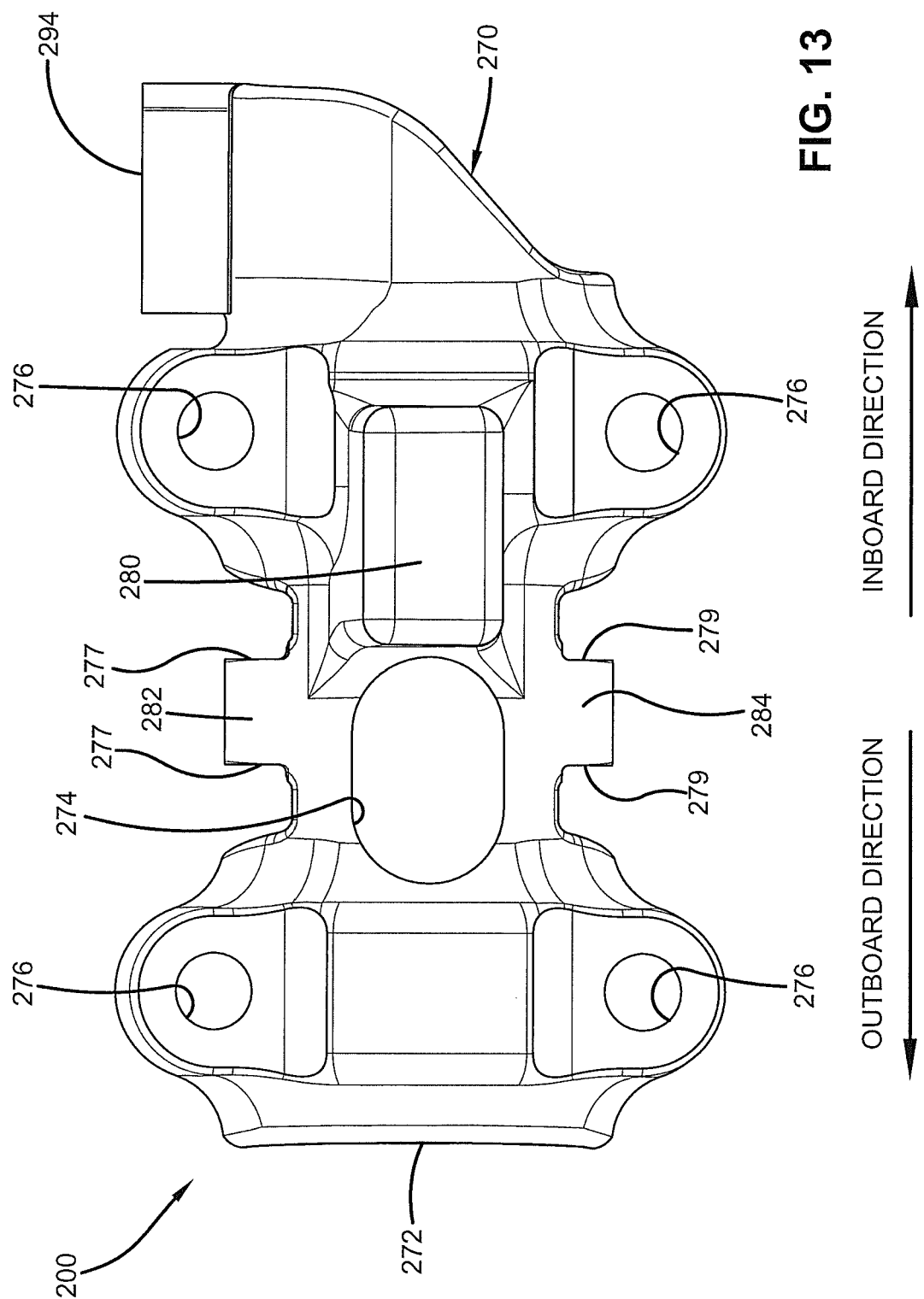
FIG. 13 is a top plan view of the top pad shown in FIGS. 10-12.

With particular reference to FIGS. 11-13, top pad 270 of axle-to-beam connection 200 includes a body 272 with a generally inverted U-shaped cross-section. Body 272 is formed as a single piece by any suitable process, such as casting or forging, from any suitable material, such as steel or ductile iron, to provide the body with a sturdy, resilient structure. Body 272 is formed with a generally arcuate curvature 281 at an outboard end of the body. Curvature 281 may have any suitable dimension or shape, such that the curvature is complementary to and disposed on and partially about a portion of axle 217, partially encompassing the axle (FIG. 6).

Figure 6:
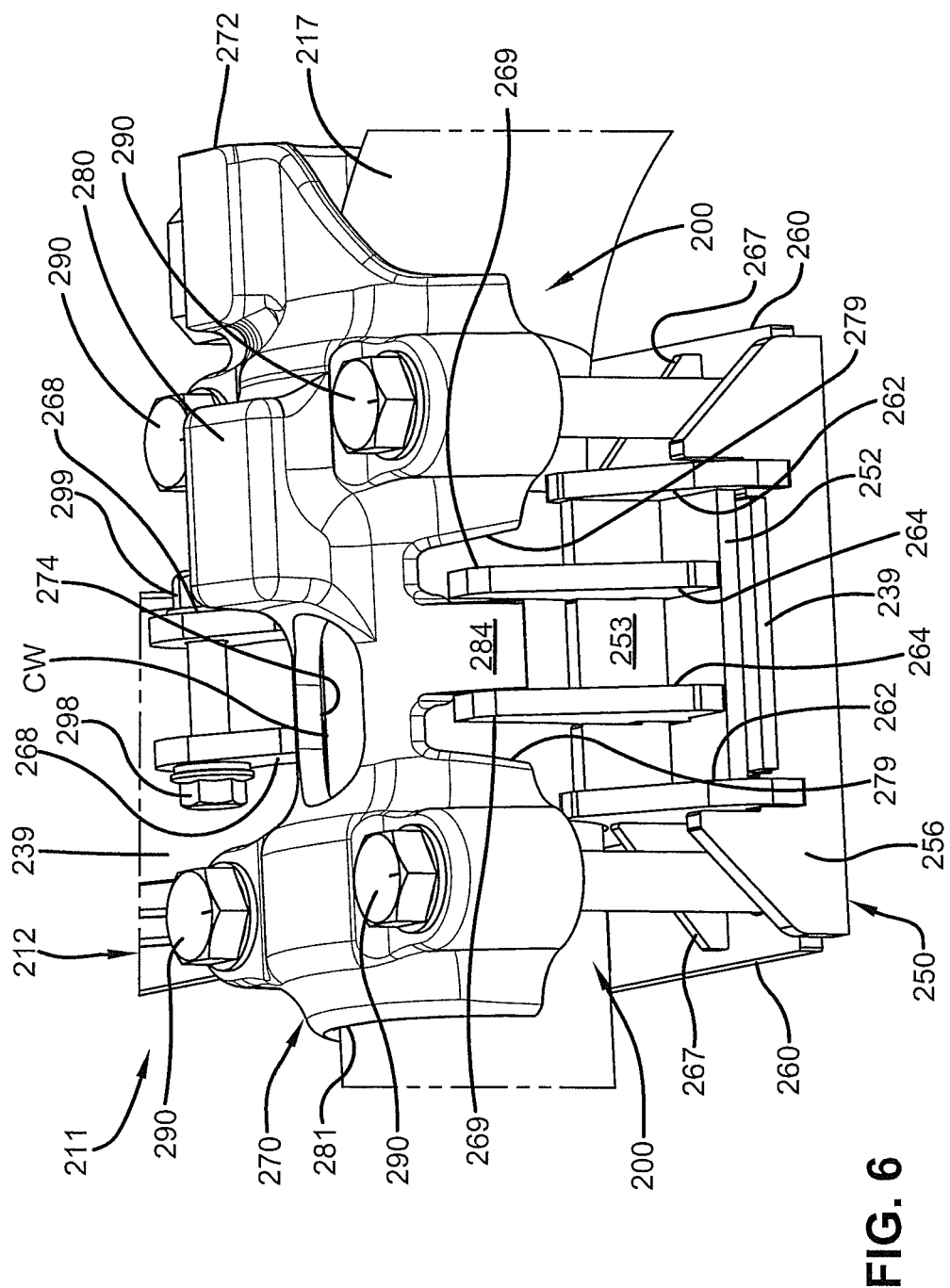
FIG. 6 is an enlarged fragmentary perspective view of a portion of the driver-side suspension assembly of the axle/suspension system shown in FIGS. 3-5, showing the exemplary embodiment axle-to-beam connection of the disclosed subject matter.
Figure 7:
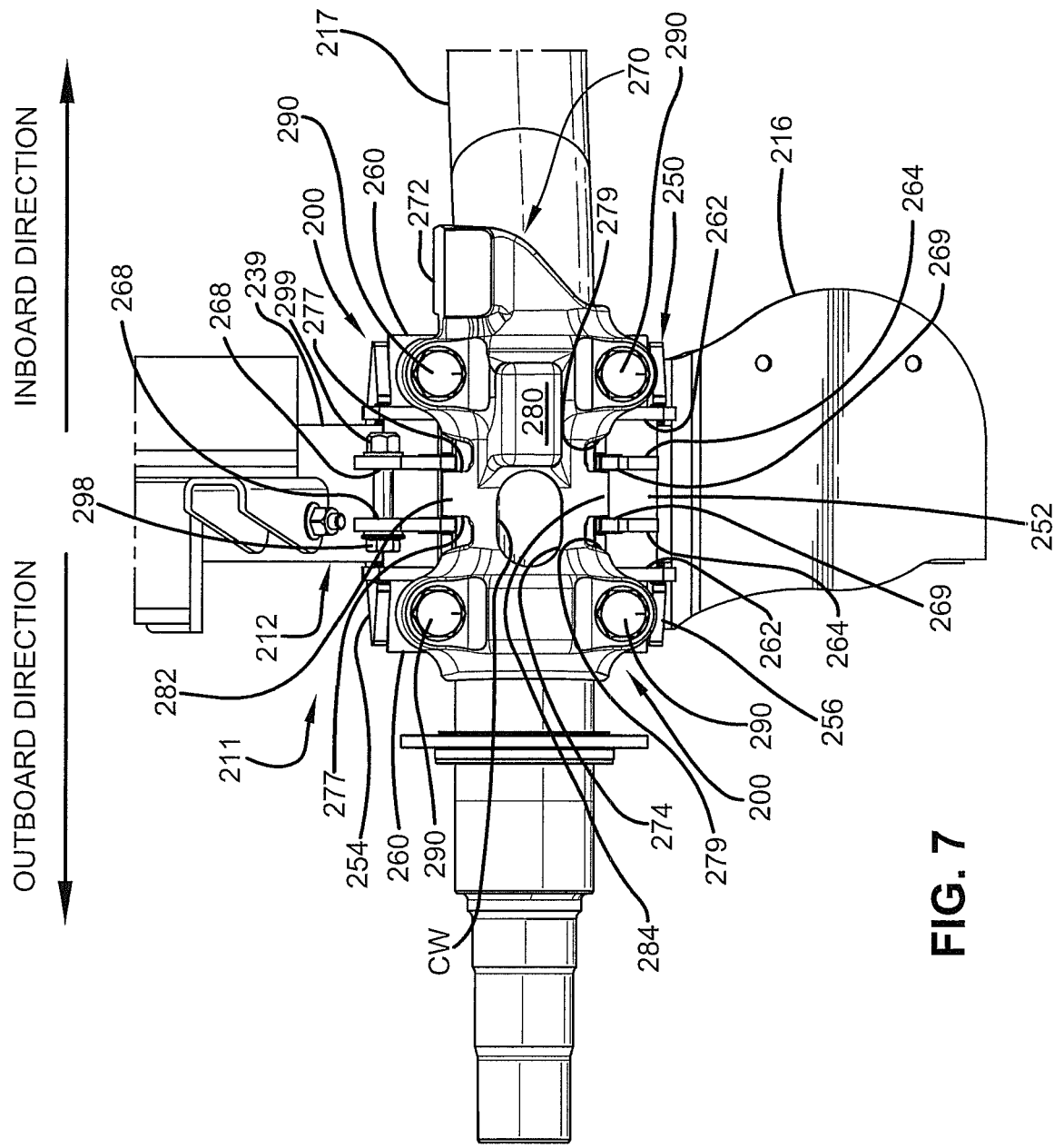
FIG. 7 is an enlarged fragmentary top plan view of a portion of the driver-side suspension assembly shown in FIG. 3, showing the exemplary embodiment axle-to-beam connection of the disclosed subject matter.

With particular reference to FIGS. 6-8, 11, and 13, body 272 of top pad 270 includes a pair of transversely-spaced rear notches 279, which form a rear alignment flange 284 therebetween. Similarly, body 272 also includes a pair of transversely spaced front notches 277 (FIGS. 7 and 11-13), which form a front alignment flange 282, which is longitudinally aligned with rear alignment flange 284. Body 272 is formed with two pairs of longitudinally parallel openings 276. Each pair of openings 276 is formed in body 272 near a respective inboard or outboard end of the body. Rear alignment flange 284 nests between a pair of rear alignment portions 269, each integrally formed with respective inner seating plates 264, such that openings 276 of top pad 270 are vertically aligned with the respective openings 261 of the respective bolt bracket 260 of alignment assembly 250 (FIG. 6). Similarly, front alignment flange 282 nests between a pair of front alignment portions 268, each integrally formed with inner seating plates 264, such that openings 276 of top pad 270 are vertically aligned with the respective openings 261 of the respective bolt bracket 260. In this manner, axle-to-beam connection 200 enables quick and accurate alignment of axle 217, top pad 270, and alignment assembly 250 of beam 212.

In accordance with another important aspect of the disclosed subject matter, exemplary embodiment axle-to-beam connection 200 provides a strong and secure connection between axle 217 and beam 212, while eliminating line welds on the axle. In particular, a window 274 is formed through body 272 of top pad 270 on or adjacent to the longitudinal and transverse centers of the body. More particularly, a continuous weld CW (FIGS. 6-7) is laid along the inside of window 274 between the continuous inner perimeter of the window and the top of axle 217 to rigidly secure top pad 270 to the axle. Continuous weld CW minimizes or eliminates the formation of stress risers, providing a generally stronger and more resilient connection compared to line welds of the prior art. In addition, body 272 also extends transversely along and partially encompasses axle 217 both inboardly and outboardly from continuous weld CW at window 274, allowing top pad 270 to react forces imparted on axle-to-beam connection 200 during operation of the heavy-duty vehicle, thereby reducing stress on the continuous weld and further strengthening the axle-to-beam connection. Furthermore, because both front and rear support plates 254, 256 are attached to or integrated into beam 212, loads imparted on axle-to-beam connection 200 are transferred throughout the structure of the beam, providing additional torsional stiffness to, and reducing stress on, the axle-to-beam connection. Thus, by utilizing continuous weld CW to attach top pad 270 to axle 217 in combination with the structure of the top pad, exemplary embodiment axle-to-beam connection 200 provides a stronger, more resilient and secure connection capable of withstanding forces imparted on the axle-to-beam connection during operation of the heavy-duty vehicle in harsh driving conditions, such as on harsh road surfaces.

In accordance with yet another important aspect of the disclosed subject matter, exemplary embodiment axle-to-beam connection 200 enables removable attachment of axle 217 to beam 212. More specifically, bolts 290 (FIGS. 3-8) are disposed through openings 276 of top pad 270 and the respective vertically aligned openings 261 of alignment assembly 250 to removably secure the top pad to the alignment assembly once corresponding nuts 292 (FIGS. 3-5) are tightened, thereby securing axle 217 to beam 212 of suspension assembly 211 to complete exemplary embodiment axle-to-beam connection 200. Because top pad 270 is rigidly attached to axle 217 by continuous weld CW and can be securely and removably connected to alignment assembly 250 of beam 212 utilizing bolts 290 and nuts 292, the axle does not need to be welded to the beam and/or components of the beam alignment assembly. As a result, axle 217 with top pad 270 attached and suspension assemblies 211 can be shipped separately and assembled on site without welding equipment, decreasing shipping costs as compared to axle/suspension systems utilizing prior art axle-to-beam connections with axles irremovably attached to the suspension assemblies during manufacturing. Body 272 is also formed with a brake chamber mounting structure 294 (FIGS. 11-13) that is adjacent the inboard end of and extends frontwardly and downwardly from the body. Brake chamber mounting structure 294 is formed with a pair of longitudinal threaded openings 295 arranged vertically in parallel, enabling attachment of a brake chamber bracket (not shown) that supports a brake air chamber (not shown).

In accordance with yet another important aspect of the disclosed subject matter, body 272 of top pad 270 is formed with a substantially vertically extending boss 280. Boss 280 is formed, such that it is substantially aligned with the respective main member of the heavy-duty vehicle to which the respective hanger 218 is attached. Boss 280 acts as a bump stop capable of sufficiently reacting forces imparted on top pad 270, and thus axle-to-beam connection 200, during extreme jounce events of suspension assembly 211 when the top pad strikes the respective main member of the heavy-duty vehicle. Thus, boss 280 prevents potential damage to components of axle-to-beam connection 200 and axle 217 during extreme jounce events, while eliminating the need for discrete bump stops attached to or incorporated into components of axle/suspension system 210 and/or the main member of the heavy-duty vehicle, and reducing heavy-duty vehicle manufacturing costs and complexity.

Thus, exemplary embodiment axle-to-beam connection 200 of the disclosed subject matter is relatively lighter, reduces manufacturing cost and complexity, eliminates line welds on axle 217, includes structure that minimizes stress on the axle, and facilitates removable attachment of axle to beam 212, thereby providing a stronger, more resilient axle-to-beam connection and enabling separate shipment of the axle and suspension assemblies 211 and on-site assembly without the need for welding equipment. Exemplary embodiment axle-to-beam connection 200 of the disclosed subject matter also provides alignment assembly 250 incorporated into beam 212, which enables top pad 270 and axle 217 to be accurately aligned with the beam to facilitate quick and simplified attachment, thereby increasing assembly efficiency and reducing labor costs. In addition, exemplary embodiment axle-to-beam connection 200 provides top pad 270 with boss 280 to act as a mechanical bump stop to prevent damage to components of axle/suspension system 210 during jounce events.

It is understood that axle-to-beam connection 200 of the disclosed subject matter can include additional or alternative means for securing the connection between axle 217 and beam 212 without affecting the overall concept or operation of the disclosed subject matter. It is contemplated that alignment assembly 250 and top pad 270 of axle-to-beam connection 200 could have different structures than those shown, such as having different forms and/or including different components, without affecting the overall concept or operation of the disclosed subject matter.

It is contemplated that exemplary embodiment axle-to-beam connection 200 of the disclosed subject matter could be utilized on heavy-duty vehicles having frames or subframes, which are moveable or non-movable, and having one or more than one axle without changing the overall concept or operation of the disclosed subject matter. It is also contemplated that axle-to-beam connection 200 of the disclosed subject matter could be utilized in conjunction with leading- and/or trailing-arm beam-type axle/suspension system designs with bottom-mount/underslung, top-mount/overslung, or top-mount/underslung beams, including beams made of any suitable material, such as metal, metal alloy, composite, and/or combinations thereof, or with different designs and/or configurations than those shown and described, such as solid beams, shell-type beams, truss structures, intersecting plates, spring beams and parallel plates, without changing the overall concept or operation of the disclosed subject matter. It is yet even further contemplated that axle-to-beam connection 200 of the disclosed subject matter could be utilized in conjunction with axles having any suitable structure, such as straight axles or raised-center axles, and any suitable fixed or varied wall thicknesses or other cross-sectional or overall shapes without changing the overall concept or operation of the disclosed subject matter. The disclosed subject matter also finds application in intermediary structures such as spring seats.

Accordingly, the axle-to-beam connection of the disclosed subject matter is simplified; provides an effective, safe, inexpensive and efficient structure and method, which achieve all the enumerated objectives; provide for eliminating difficulties encountered with prior art axle-to-beam connections; and solve problems and obtain new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed.

The subject disclosure has been described with reference to a specific embodiment. It is understood that this description and illustration is by way of example and not by way of limitation. Potential modifications and alterations will occur to others upon a reading and understanding of this disclosure, and it is understood that the subject disclosure includes all such modifications, alterations, and equivalents thereof.

Having now described the features, discoveries and principles of the disclosed subject matter; the manner in which the axle-to-beam connection is used and installed; the characteristics of the construction, arrangement, and method steps; and the advantageous, new, and useful results obtained, the new and useful structures, devices, elements, arrangements, process, parts, and combinations are set forth in the appended claims.

What is claimed is:

1. An axle-to-beam connection for a suspension assembly of an axle/suspension system comprising:
    an axle;
    a beam including an alignment assembly for aligning said axle with said beam, said alignment assembly interposed between the beam and the axle; and
    a top pad, the top pad comprising a window, said window being substantially aligned with a top portion of said axle, said top pad being fixedly attached to said axle by a continuous weld formed in said window between the top pad and the axle, said top pad being removably attached to said alignment assembly.

2. The axle-to-beam connection of claim 1, said top pad further comprising a structure to act as bump stop during jounce events.

3. The axle-to-beam connection of claim 1, said top pad being substantially vertically aligned with said alignment assembly.

4. The axle-to-beam connection of claim 3, said top pad further comprising at least one flange for alignment with said alignment assembly of said beam, said at least one flange being received by the alignment assembly.

5. The axle-to-beam connection of claim 3, said top pad further comprising at least one opening vertically aligned with an opening formed in said alignment assembly;
    wherein said top pad is removably attached to said alignment assembly by at least one fastener disposed through said openings.

6. The axle-to-beam connection of claim 1, said alignment assembly further comprising a bottom plate, a pair of outer seating plates, and one or more inner seating plates, said bottom plate being operatively connected to a top surface of said beam.

7. The axle-to-beam connection of claim 6, said pair of outer seating plates and said one or more inner seating plate being fixedly attached to said bottom plate and arranged in parallel longitudinal alignment with respect to said beam.

8. The axle-to-beam connection of claim 7, said pair of outer seating plates, said one or more inner seating plate, and said beam forming an axle locus for receiving said axle.

9. An axle-to-beam connection for a suspension assembly of an axle/suspension system comprising:
    an axle;
    a beam including an alignment assembly for aligning said axle with said beam; and
    a top pad, said top pad being fixedly attached to said axle and removably attached to said alignment assembly, the top pad including a window, said window being substantially aligned with a top portion of said axle, said top pad being fixedly connected to the axle by a continuous weld formed in said window between the top pad and said axle, the top pad being substantially vertically aligned with the alignment assembly, said top pad including at least one flange for alignment with said alignment assembly of said beam, said at least one flange being received by the alignment assembly.

10. An axle-to-beam connection for a suspension assembly of an axle/suspension system comprising:
    an axle;
    a beam including an alignment assembly for aligning said axle with said beam; and
    a top pad, said top pad being fixedly attached to said axle and removably attached to said alignment assembly, the alignment assembly including a bottom plate, a pair of outer seating plates, and one or more inner seating plates, said bottom plate being operatively connected to a top surface of said beam.

11. The axle-to-beam connection of claim 10, said pair of outer seating plates and said one or more inner seating plate being fixedly attached to said bottom plate and arranged in parallel longitudinal alignment with respect to said beam.

12. The axle-to-beam connection of claim 11, said pair of outer seating plates, said one or more inner seating plate, and said beam forming an axle locus for receiving said axle.

* * * * *